(No Model.)
J. BENDIX.
PROCESS OF FILTERING ALCOHOL.
No. 333,721. Patented Jan. 5, 1886.
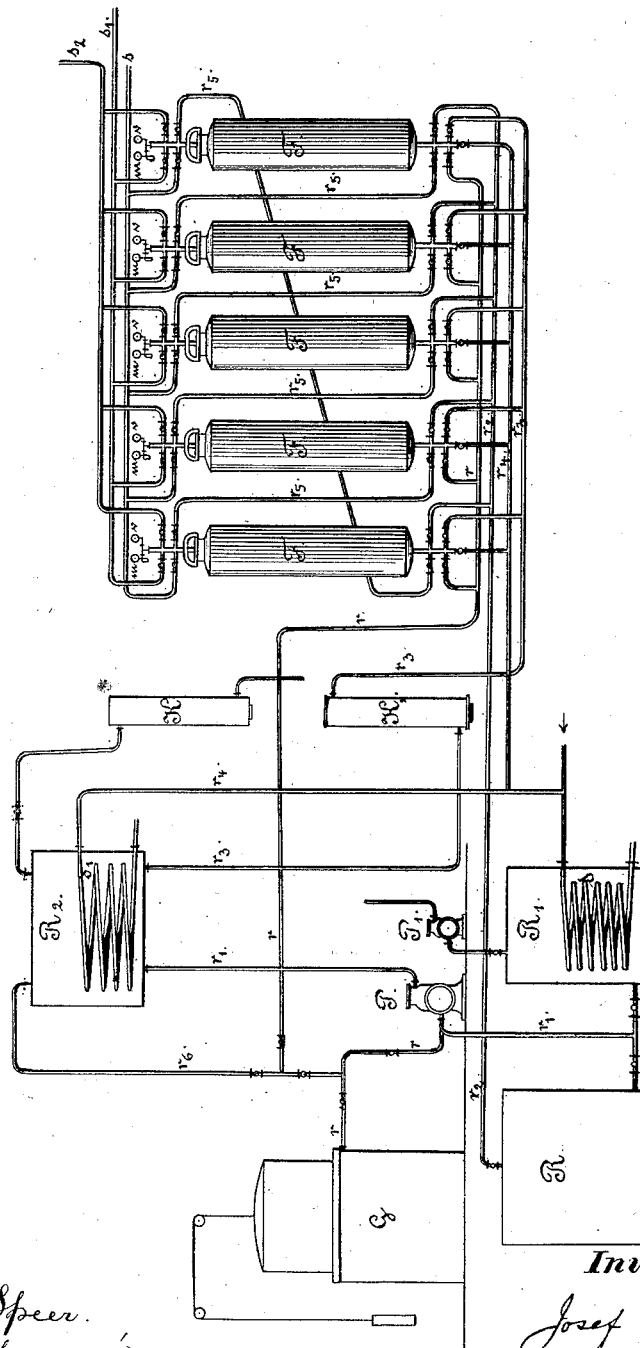
Witnesses:
John M. Speer.
Gustav Schneppé.
Inventor:
Josef Bendix
by his attorneys
Bresen & Steele

UNITED STATES PATENT OFFICE.

JOSEF BENDIX, OF BERLIN, GERMANY.

PROCESS OF FILTERING ALCOHOL.

SPECIFICATION forming part of Letters Patent No. 333,721, dated January 5, 1886

Application filed August 7, 1885. Serial No. 173,869. (No specimens.)

*To all whom it may concern:*

Be it known that I, JOSEF BENDIX, chemist, of Berlin, Prussia, Germany, have invented a certain Improved Process of Filtering Alcohol in the Absence of Atmospheric Oxygen, of which the following is a true and clear specification, reference being had to the annexed drawing, which is an elevation of the apparatus used in my process.

If raw spirit of 50° to 60° Tralles is brought in contact with revivified charcoal, the latter absorbs the greater portion of the impurities contained in the raw spirit, above all the homologues of the alcohol: amyl-butyl-propyl-alcohol, known as "fusel-oil."

The filtering process hitherto used can effect but a partial purification of the spirit under treatment, since the coal, by virtue of the oxygen in its pores, partly oxidizes the alcohol, forming of the same a number of products of oxidation, above all aldehyde. This explains the increased temperature produced when the spirit and the coal are brought in contact. That the aldehyde quality of filtered spirit is originated by filtration is demonstrated by the circumstance that no aldehyde is contained in unfiltered raw spirit. The low boiling-point of the aldehyde does, nevertheless, not facilitate the separation of the pure spirit from the aldehyde, which is performed only with great difficulty by partial distillation.

The process which is the object of the present invention obviates the production of aldehyde in the course of the filtering process through charcoal, and represents, therefore, an essential technical progress. To obtain this result, the filtration is to be performed in airless apparatus—that is, apparatus free from oxygen—and by using absolutely airless coal and airless spirit—that is to say, any contact of the spirit with free oxygen ought to be excluded during filtration.

The withdrawal of the air from the coal is effected in the filters in such manner as also to make the latter free from air. This can be done either (*a*) by means of an efficient air-pump, or (*b*) by continuously carrying the mixture through a gas—such as carbonic-acid gas—or (*c*) by heating the coal directly in a current of steam of about two atmospheres pressure, and during at least one and one-half to two hours.

As the last-mentioned method recommends itself from an economical point of view, and also in regard to the easy execution, the whole succession of operations shall be described here upon this foundation.

The first operation which is always necessary, as is generally known, is the dilution by water of the raw spirit to about 50° to 60° Tralles.

In contradistinction to the process heretofore used, only airless—that is, boiled—water is employed for the dilution.

R in the drawing is the reservoir containing the unfiltered spirit; R', the vessel containing water. The mixture is carried by a pump, P, by pipe $r'$ into a closed elevated pressure-reservoir $R^2$, and flows from there to the filters F F. First, however, the raw spirit is to be freed from air. For this purpose the spirit is either heated to nearly its boiling-point and cooled again in a cooler, or it is impregnated under higher pressure with carbonic acid, the largest part of which escapes again when afterward the pressure is released, carrying along with it mechanically the air that was contained in the spirit. Practically this manipulation assumes a very simple shape. The pump P is allowed to suck carbonic-acid gas from a reservoir, G, and forces it, together with the spirit or diluted spirit, by pipe $r'$, into the reservoir $R^2$. The absorption of the gas then takes place in the reservoir $R^2$, or in the pump itself, and the release of pressure is effected as the spirit containing the gas approaches the reservoir during the act of pumping. The gas collects as a heavy aeriform layer above the spirit which has been pumped up, and protects, furthermore, the fluid against contact with the atmospheric air. Meanwhile a filter, F, has been charged with freshly-revivified charcoal, and a strong jet of steam of at least two atmospheres has been carried through the latter.

The filters are of the usual construction, each being provided with a pressure-gage, $m$, and vacuum-gage $v$. After the steam has operated on the coal for one and one-half to two hours, the process of withdrawing the air from the coal is finished, whereupon the steam-entrance valve and the steam-outlet valve are shut simultaneously. After some time a vacuum is created inside of the filter by the condensation of the steam, which is shown and measured by the vacuum-gage, and now the spirit-supply pipe $r^3$, leading into the bottom of the filter, is opened. The filter is gradually filled with spirit, on account of the vacuum. The pressure-gage $m$ shows the time when the filling is complete. As soon as the pressure-gage ceases to show any increase of pressure, the outlet-valve on top of the filter is opened, when the liquid flows by pipe $r^5$ to the next filter, and so forth. By these means the spirit does not come into contact with air during the whole filtering process, oxidation cannot take place, and the filtrate obtained is of a much greater purity than that produced by the usual process. The pores of the charcoal being free from air, the spirit penetrates into the very heart of the coal, and therefore the effectiveness of the coal is considerably increased.

I claim—

The process herein described of filtering alcoholic fluid, which process consists in first diluting the alcohol, in then depriving it of atmospheric air by a charge of gas, and then forcing it through charcoal from which the air has been removed by a charge of steam, substantially as herein shown and described.

This specification signed by me this 13th day of June, 1885.

JOSEF BENDIX.

Witnesses:
 B. ROI,
 CARL T. BURRHARDT.